US006496997B1

United States Patent
Murari et al.

(10) Patent No.: US 6,496,997 B1
(45) Date of Patent: Dec. 24, 2002

(54) HARD DISK DRIVER WITH AN INTEGRATED STRUCTURE FOR ELECTROSTATICALLY REMOVING DIELECTRIC PARTICLES GENERATED DURING THE OPERATION, AND ELECTROSTATIC CLEANING METHOD FOR A HARD DISK DRIVER

(76) Inventors: Bruno Murari, Via Ardigó, 1, 20052 Monza (IT); Benedetto Vigna, Via S. Angelo, 37, 85010 Pietrapertosa (IT); Paolo Ferrari, Via Cavallotti, 14, 21013 Gallarate (IT)

( * ) Notice: Subject to any disclaimer, the term of this patent is extended or adjusted under 35 U.S.C. 154(b) by 0 days.

(21) Appl. No.: 09/357,441

(22) Filed: Jul. 20, 1999

(30) Foreign Application Priority Data

Jul. 22, 1998 (EP) ............................................. 98830446

(51) Int. Cl.⁷ ............................... B08B 7/00; B08B 7/04
(52) U.S. Cl. ........................... 15/1.51; 134/1; 209/128; 209/129; 209/130
(58) Field of Search ................................. 209/128, 129, 209/130; 15/1.51; 134/1

(56) References Cited

U.S. PATENT DOCUMENTS

| | | | |
|---|---|---|---|
| 3,789,378 A | 1/1974 | Bonzano et al. | 340/174.1 |
| 4,065,677 A | 12/1977 | Micheron et al. | 307/112 |
| 5,025,346 A | 6/1991 | Tang et al. | 361/283 |

(List continued on next page.)

FOREIGN PATENT DOCUMENTS

| | | |
|---|---|---|
| EP | 0 482 205 A1 | 4/1992 |
| EP | 0 533 095 A2 | 3/1993 |
| EP | 0 578 228 A3 | 1/1994 |
| EP | 0 578 228 A2 | 1/1994 |
| EP | 0 613 124 A2 | 8/1994 |
| EP | 0 840 291 A2 | 5/1998 |
| JP | 07-177773 | 7/1995 |
| WO | WO 93/21536 | 10/1993 |
| WO | WO 95/34943 | 12/1995 |

OTHER PUBLICATIONS

Tang et al., "Laterally Driven Polysilicon Resonant Microstructures," *Sensors and Actuators*. (20):25–32, Npv. 15, 1989.

Starr, "Squeeze–Film Damping in Solid–State Accelerometers," *IEEE Solid–State Sensor an Actuator Workshop*, pp. 44–47, Jun. 1990.

Gianchandani et al., "Batch Fabrication and Assembly of Micromotor–Driven Mechanisms With Multi–Level Linkages," *Micro Electro Mechanical Systems*, IEEE, pp. 141–146, 1992.

Lee et al., "Polysilicon Micro Vibromotors," *Micro Electro Mechanical Systems*, IEEE, pp. 177–182, Feb. 4–7, 1992.

Fujita et al., "Position Control Of An Electrostatic Linear Actuator Using Rolling Motion," *Mechatronics*, vol. 2, No. 5, pp. 495–502, Oct., 1992.

Zhang et al., "Viscous Air Damping in Laterally Driven Microresonators." *IEEE Workshop No. 7*, pp. 199–204, Jan. 25, 1994.

(List continued on next page.)

*Primary Examiner*—Alexander Markoff

(57) ABSTRACT

An electrostatic cleaning structure of a hard disk driver is formed by a plurality of concentric conductive regions to which biasing pulse trains are supplied. Each biased conductive region generates an electric field attracting any dielectric particle. The pulse trains supplied to immediately adjacent conductive regions are phase-shifted by a predetermined time and in a direction linked to a desired direction of removal for the electrostatic particles. Voltage pulses sent to each conductive region are delayed with respect to voltage pulses sent to an immediately preceding conductive region in the direction of desired removal, and are advanced with respect the voltage pulses sent to an immediately successive conductive region.

15 Claims, 3 Drawing Sheets

U.S. PATENT DOCUMENTS

| | | | |
|---|---|---|---|
| 5,151,763 A | 9/1992 | Marek et al. ................. | 357/26 |
| 5,216,631 A | 6/1993 | Sliwa, Jr. .................... | 365/174 |
| 5,233,213 A | 8/1993 | Marek ........................ | 257/415 |
| 5,428,259 A | 6/1995 | Suzuki ....................... | 310/309 |
| 5,438,469 A | 8/1995 | Rudi .......................... | 360/109 |
| 5,477,097 A | 12/1995 | Matsumoto ................. | 310/309 |
| 5,521,778 A | 5/1996 | Boutaghou et al. ......... | 360/106 |
| 5,631,514 A | 5/1997 | Garcia et al. ............... | 310/309 |
| 5,658,718 A | 8/1997 | Jurgenson et al. .......... | 360/106 |
| 6,243,350 B1 * | 7/2001 | Knight et al. ............... | 369/126 |

OTHER PUBLICATIONS

Fan et al., "Magnetic Recording Head Positioning at Very High Track Densities Using a Microactuator–Based, Two–Stage Servo System," *Transactions on Industrial Electronics*, IEEE, 42(3):222–233, Jun. 1995.

Moesner et al, "Electrostatic Devices For Particle Micro–Handling," *IEEE*, pp. 1302–1309, 1995.

Imamura et al., "Transverse Mode Electrostatic Microactuator For MEMS–Based HDD Slider," *IEEE*, pp. 216–221, 1996.

Horsley et al., "Angular Micropositioner For Disk Drives," *IEEE MEMS '97 Workshop* Nagoya, Japan.

Veijola et al., "Model for Gas Film Damping in a Silicon Accelerometer," *1997 International Conference on Solid–State Sensors and Actuators*, pp. 1097–1100, Jun. 16–19, 1997.

Pannu et al., "Accelerometer Feedforward Servo For Disk Drives." Presented at the *Advanced Intelligent Mechatronics–International Conference*, Tokyo, Japan, Jun. 1997.

Aggarwal, "Design and Control of Micro–Actuators For High Density Disk Drives," *Thesis Graduate Divison—University of California at Berkeley*, May 1997.

Aggarwal et al., "Micro–Actuators For High Density Disk Drives," *American Control Conference*, 1997.

Peter Mee et al, "Only Clean Drives Are Good Drives," *Data Storage*, pp. 77–80, Sep., 1997.

* cited by examiner

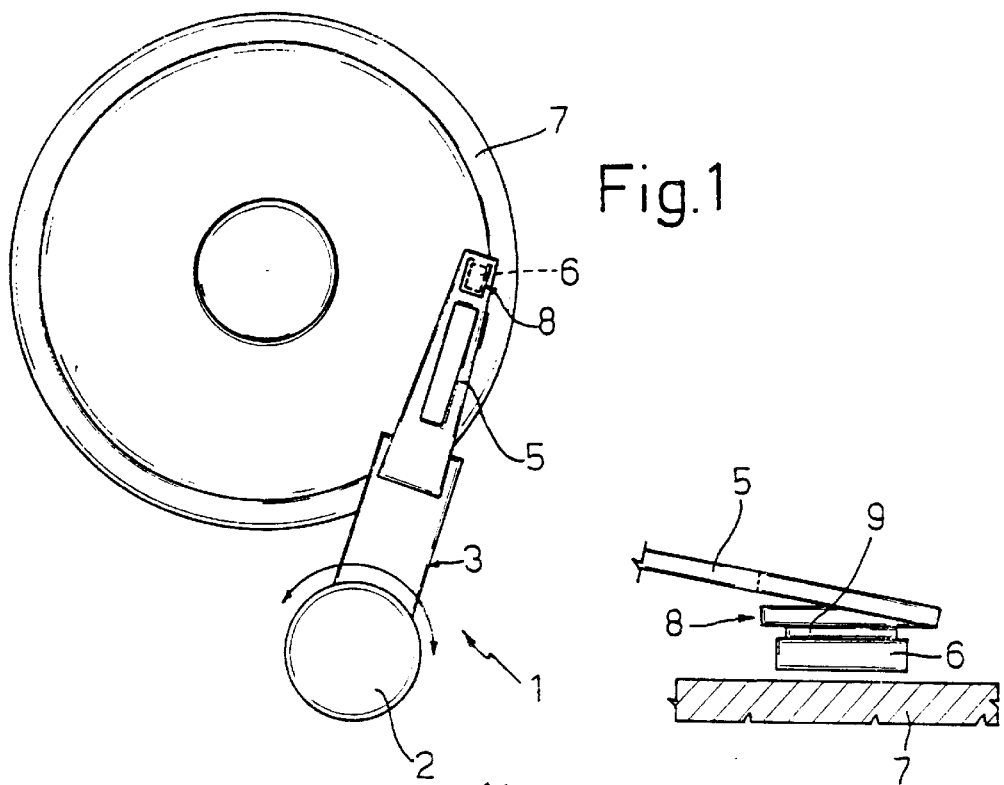
Fig. 1
Fig. 2
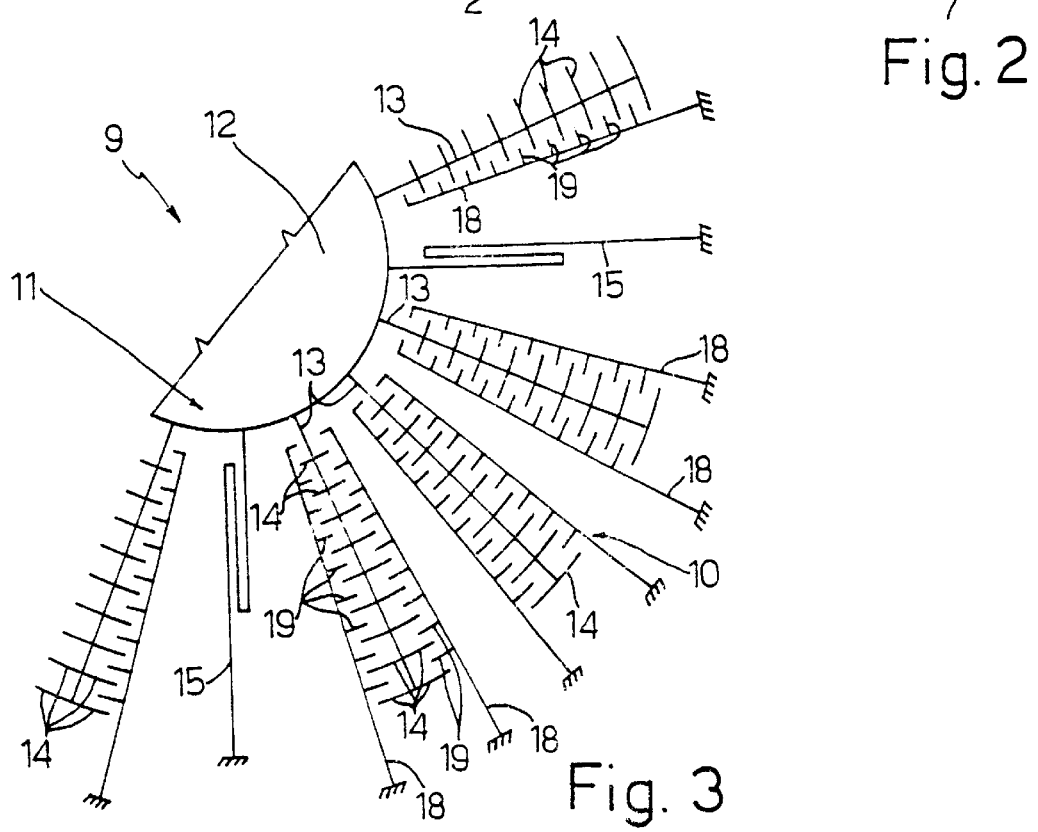
Fig. 3

HARD DISK DRIVER WITH AN INTEGRATED STRUCTURE FOR ELECTROSTATICALLY REMOVING DIELECTRIC PARTICLES GENERATED DURING THE OPERATION, AND ELECTROSTATIC CLEANING METHOD FOR A HARD DISK DRIVER

TECHNICAL FIELD

This invention relates to a hard disk driver with an integrated structure electrostatically removing dielectric particles generated during the operation, and an electrostatic cleaning method for a hard disk driver.

BACKGROUND OF THE INVENTION

As is known, hard disk drivers with electrostatic-type micrometric actuation often generate harmful dielectric particles that may block the microactuator during operation.

Centrifuge or forced-air jet systems have been proposed to address this problem. Both solutions are very costly and bulky, however, and are not applicable to devices of small size such as the above-mentioned microactuator for hard disks.

SUMMARY OF THE INVENTION

An advantage of the invention is therefore to provide a small-sized structure for removing dielectric particles from the surface of the microactuator of a hard disk driver, which is compatible with integrated devices and is inexpensive to produce and operate.

Embodiments of the present invention provide a hard disk driver having an integrated structure for electrostatic removal of dielectric particles, and an electrostatic cleaning method for a hard disk driver.

In practice, embodiments of the invention provide a plurality of conductive regions that are adjacent and spaced apart to each other and to which bias pulse trains are supplied. Each biased conductive region therefore generates an electric field that attracts any dielectric particles. The pulse trains supplied to immediately adjacent annular regions are phase-shifted of a predetermined time and in a direction linked to the direction of removal desired for the electrostatic particles. In particular, each conductive region receives voltage pulses delayed with respect to the voltage pulses sent to the immediately preceding conductive region in the direction of desired removal and advanced with respect to the voltage pulses sent to the immediately successive conductive region.

BRIEF DESCRIPTION OF THE DRAWINGS

For an understanding of the invention an illustrative embodiment thereof will now be described, purely by way of a non-exhaustive and non-limiting example, and with reference to the accompanying drawings.

FIG. 1 shows a known type of general structure of a hard disk driver.

FIG. 2 shows a side view of a detail of the driver of FIG. 1.

FIG. 3 is a diagrammatic, partial view of a known microactuator included in the driver of FIG. 1.

In the drawings, like reference numerals refer to like parts throughout the various views, unless otherwise indicated.

DETAILED DESCRIPTION OF THE ILLUSTRATED EMBODIMENTS

Figure 4:
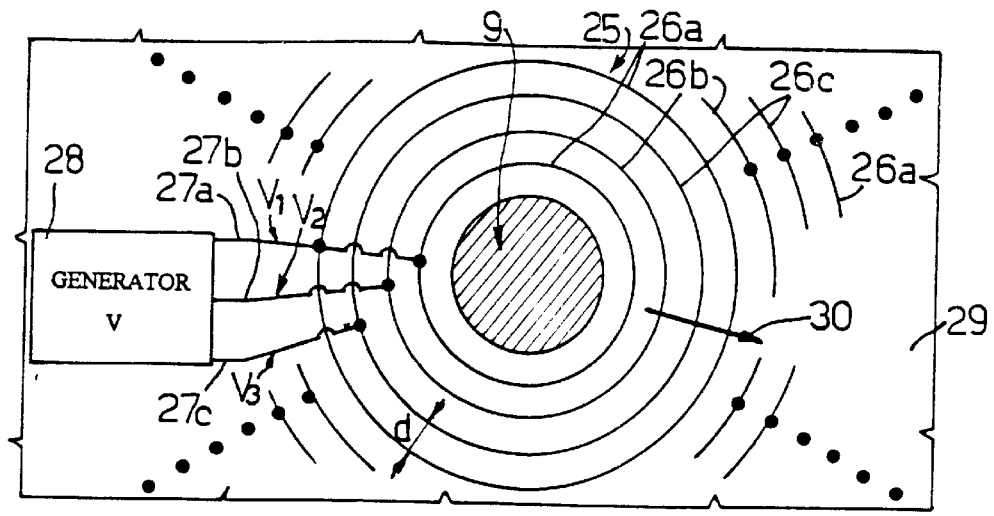
FIG. 4 shows a diagrammatic top view of an embodiment of a hard disk driver with an electrostatic surface cleaning structure of the present invention.

FIG. 1 shows a known actuating device 1 of a rotary type, forming a hard disk driver, comprising a motor 2 (also known as a "voice coil motor") attached to a support body 3. The support body 3 has at least one suspension 5 formed by a cantilevered lamina. At an end not connected to the support body 3, the suspension 5 has a R/W (read/write) transducer 6 (also known as a "slider") and disposed (when in an operating condition) facing a surface of a hard disk 7. The R/W transducer 6 is connected to a coupling (known as a "gimbal" 8), via a microactuator 9 (see, e.g., FIG. 2).

The actuating device 1 is a dual-actuation type. A first, coarser actuation stage is formed by the motor 2 that moves a unit formed by the support body 3, the suspension 5 and the R/W transducer 6 across the hard disk 7 during tracking. A second, finer actuation stage is formed by the microactuator 9, the purpose of which is to accurately control a position of the R/W transducer 6.

The microactuator 9 of FIG. 3 is a rotary electrostatic type (only a part of which is shown due to its radial symmetry) and comprises an external stator 10, intended to be rigidly connected to the gimbal 8 (see, e.g., FIG. 2) and an internal rotor 11, intended to be bonded to the R/W transducer 6 (see, e.g., FIG. 2) and capacitively coupled to the stator 10.

The rotor 11 comprises a suspended mass 12 of a substantially circular shape and a plurality of movable arms 13 extending radially towards the outside from the suspended mass 12. Each movable arm 13 has a plurality of movable electrodes 14 extending in a substantially circumferential direction and equidistant from each other. The rotor 11 further comprises anchoring and elastic suspension elements (shown as springs 15) for supporting and biasing the rotor 11.

The stator 10 comprises a plurality of fixed arms 18 extending radially and each bearing a plurality of fixed electrodes 19. In particular, associated with each movable arm 13 are two fixed arms 18, the fixed electrodes 19 of which extend towards the associated movable arm 13 and are intercalated or interleaved with the movable electrodes 14.

FIG. 4 shows a cleaning structure 25 for removing dielectric particles from the microactuator 9 of FIG. 3. The cleaning structure 25 comprises a plurality of annular regions 26a, 26b, 26c, of electrically conductive material, such as metal, disposed concentrically around the microactuator 9. The annular regions 26a, 26b, 26c (at least three regions) are spaced at a uniform distance d, for example the distance d is comprised between 1 and 10 μm (or of the same order of magnitude as the dielectric particles to be removed) and have a width, for example, also comprised between 1 and 10 μm.

The annular regions 26a, 26b, 26c are connected by three conductive lines 27a, 27b, 27c alternately every three regions (e.g., so that each annular region is connected to a third annular region that is adjacent in a radial direction towards the inside or towards the outside the cleaning structure 25). In the example shown, for clarity, annular regions electrically connected by the conductive line 27*a* are denoted by 26*a*; annular regions electrically connected by the conductive line 27*b* are denoted by 26*b*; and annular regions electrically connected by the conductive line 27*c* are denoted by 26*c*.

Figure 5:
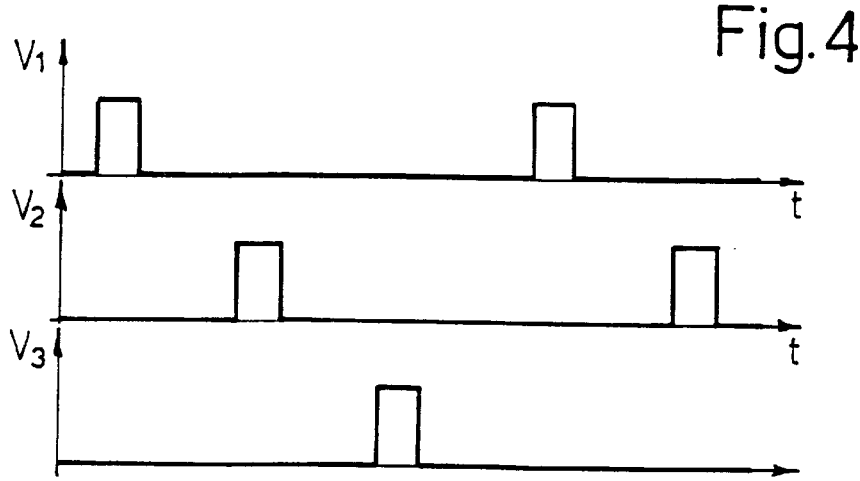
FIG. 5 shows diagrams of actuation voltages applied to the structure of FIG. 4.

A voltage source 28 is integrated into a same chip 29 having the microactuator 9, its control logic (not shown) and the cleaning structure 25. Alternatively, the voltage source 28 may be external. The voltage source 28 generates a pulsed three-phase voltage to bias the annular regions 26*a*, 26*b*, 26*c*. In particular, as shown in FIG. 5, the voltage source 28 generates three pulsed voltages V1, V2, V3, identical to each other, phase-shifted by 120° with respect to each other, and each supplied to a respective conductive line 27*a*, 27*b*, 27*c*.

Figure 6:
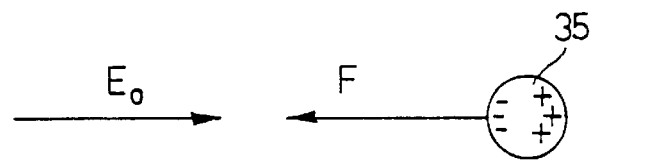
FIG. 6 shows in diagrammatic form an action of an electric field on a dielectric particle.

Biasing the annular regions 26*a*, 26*b*, 26*c* with the voltage pulse trains V1, V2, V3 that are identical and delayed causes electric fields to be generated centered from time to time on the annular regions 26*a*, 26*b*, 26*c*, which are then biased. The electric field generated by each biased annular region 26*a*, 26*b*, 26*c* causes biasing of any dielectric particle that may be present in proximity to the surface of the chip 29 and exerts, on the dielectric particle and in known manner, an attractive force of a value proportional to a gradient of the electric field (and therefore proportional to an amplitude of the voltage pulse V1, V2, or V3 applied) and inversely proportional to a cube of a distance between the biased annular region 26*a*, 26*b*, 26*c* and the dielectric particle. This action is shown diagrammatically in FIG. 6, which shows a dielectric particle 35 immersed in a field $E_o$, subject to a force F.

By sending the voltage pulses V1, V2 and V3 to the annular regions 26*a*, 26*b*, 26*c* in a correct sequence, thereby biasing in sequence, the annular regions 26*a*, 26*b*, 26*c* positioned consecutively in an external radial direction, resultant pulse forces F (which are always directed towards the outside) are generated on any dielectric particles 35. These forces F thus cause the dielectric particles 35 to move towards the outside of the cleaning structure 25, as shown diagrammatically by an arrow 30 in FIG. 4.

Figure 7:
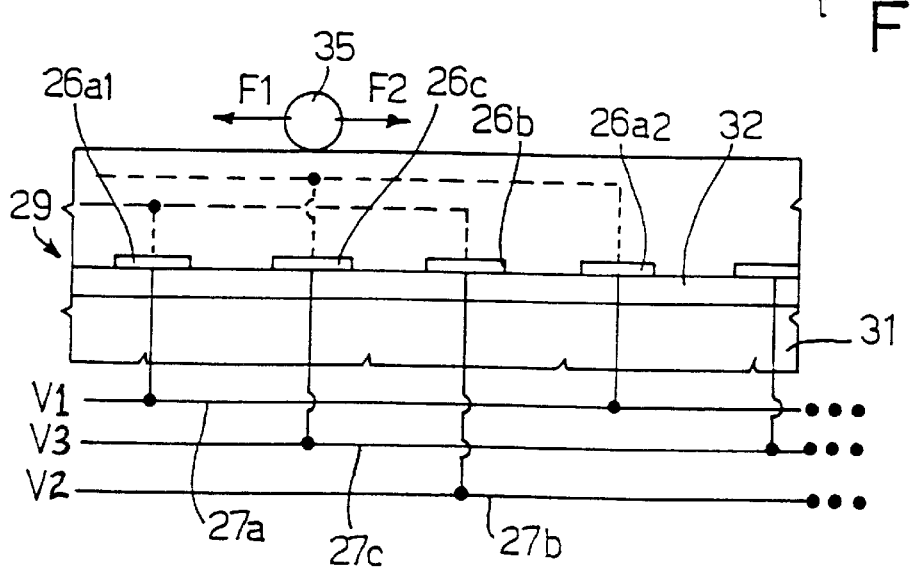
FIG. 7 is a cross-sectional view through the structure of FIG. 4, showing a principle on which the present structure operates.
Figure 8:
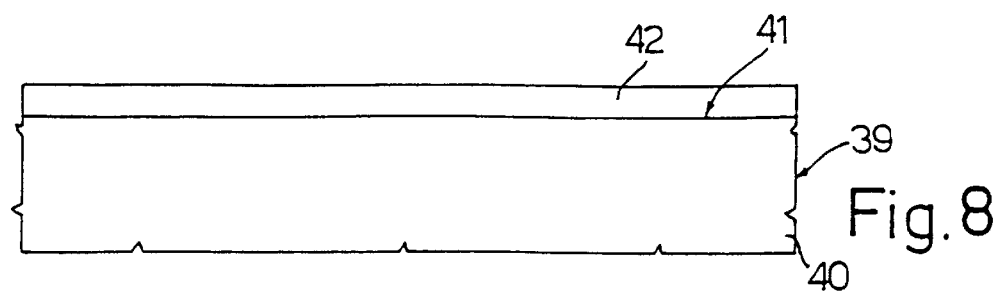
FIGS. 8 to 11 show cross-sectional views through the present structure, in successive production steps.

Action of the cleaning structure 25 is illustrated in FIG. 7, which shows a cross-section of a portion of the chip 29 to the left of the microactuator 9 (not shown). As will be explained, in FIG. 7 the annular regions 26*a*, 26*b*, 26*c* are formed by metal regions disposed on top of an insulating layer 31 extending on top of a substrate 33 made of a semiconductor material. In FIG. 7, the dielectric particle 35 is disposed above the annular region 26*c* (for example, previously attracted to the annular region 26*c* by the voltage pulse V3). Then, when the annular regions 26*a* are biased by a voltage pulse V1, two forces F1 and F2 caused by a simultaneous bias of an adjacent annular region on the left (denoted as an annular region 26*a*1 for ease of understanding) and an annular region further to the right (denoted as an annular region 26*a*2) act on the dielectric particle 35. By virtue of a distance difference between the dielectric particle 35 and the annular regions 26*a*1, 26*a*2, the force F1 is much greater than the force F2, and so a resultant force directed towards the left acts on the dielectric particle 35. The dielectric particle 35 thus moves towards the annular region 26*a*1, and thus, gradually, moves ever further towards the outside of the chip 29 due to a dielectrophoretic force.

The above-described cleaning system utilizes an application of at least three-phasic voltages, since by simply alternately biasing the annular regions (as shown in FIG. 7 by broken lines) would produce the forces F1 and F2 which would be equal to each other and opposed, and the dielectric particle 35 would remain stationary. The described cleaning system may also operate on charged particles or ions instead of on dielectric particles 35, by supplying a suitable polarity to the voltages V1, V2, V3 applied to the conductive annular regions 26*a*, 26*b*, 26*c*.

Figure 9:
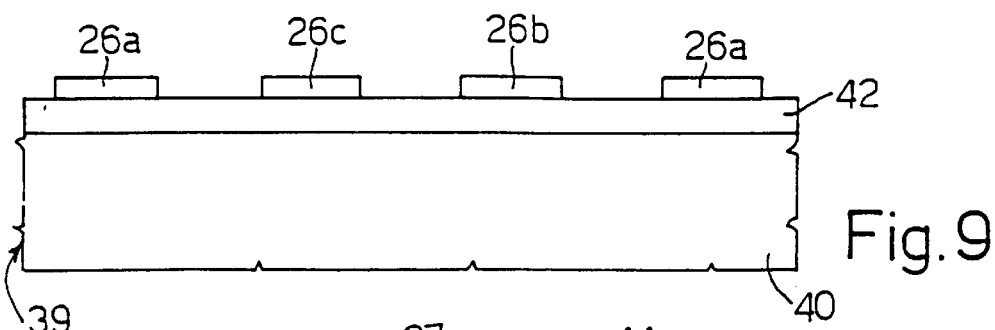
Figure 10:
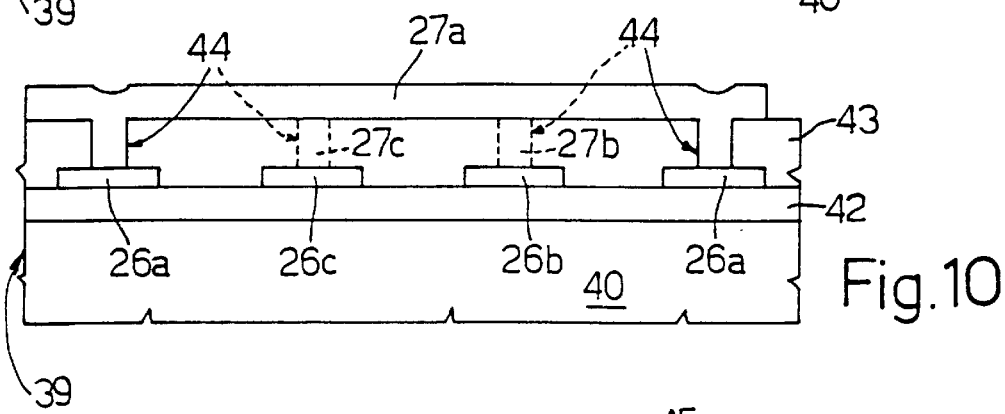
Figure 11:
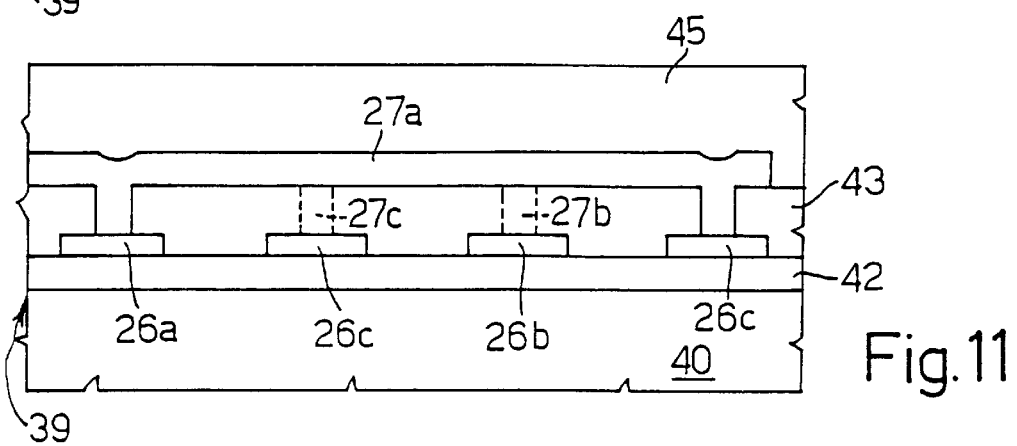

An example of production steps for the cleaning structure 25 will now be described with reference to FIGS. 8–11. Specifically, a start is made from a wafer 39 comprising a substrate 40 of a semiconductor material into which the microactuator 9, its control logic and the voltage source 28 (none of which are shown) have already been integrated. A dielectric layer 42 is present on a surface 41 of the substrate 40, such as a gate oxide layer of MOS transistors, if any are present, a layer of thermal oxide and/or a protective oxide layer formed on regions formed on the substrate 40. In FIG. 9, a first metal layer (such as aluminium) is then deposited and defined to form first electrical connections of the microactuator 9 and of its control logic (neither of which are shown) and the annular regions 26*a*, 26*b*, 26*c*. A dielectric layer 43, such as PSG (Phosphorous Silicon Glass), is then deposited. Vias 44 are then opened and a second metal layer is deposited and shaped to form second electrical interconnections of the microactuator 9 and of its control logic (neither of which are shown) and the conductive lines 27*a*, 27*b*, 27*c*, as shown in FIG. 10. FIG. 10 shows the conductive line 27*a* (the contact towards the annular regions 26*a*) and in broken lines, the contacts 27*b*, 27*c* towards the annular regions 26*b*, 26*c*, respectively. Finally, a passivation layer 45, covering all the surface of the wafer is deposited, as shown in FIG. 11.

Advantages of the above-described cleaning structure 25 include as follows. First, the cleaning structure 25 is completely integratable with current integrated devices and may thus be used in all integrated devices in which a cleaning of dielectric particles is required. Furthermore, the described cleaning structure 25 is easy to manufacture and does not require complicated process steps, and therefore does not involve additional production costs compared with those expected for the microactuator to be protected in only a special area.

Additionally, it is to be appreciated that many modifications and variations may be introduced to the cleaning structure 25 described and illustrated herein, all of which come within the scope of the invention, as defined in the accompanying claims. For instance, instead of being produced on the semiconductor substrate 40 using a metallization of the device, the described cleaning structure 25 could be integrated inside the substrate 40 or produced through polysilicon regions deposited over the substrate 40. Furthermore, instead of using a second metallization, the conductive lines 27*a*, 27*b*, 27*c* could be formed inside the substrate 40 and/or, at least in part, pass through a non-closed portion of the annular regions 26*a*, 26*b*, 26*c* of C shape. The shape of the annular regions 26*a*, 26*b*, 26*c* may vary. Instead of defining concentric circumferences, they may be formed by ovals, squares or other closed lines, for example. Furthermore, should it be necessary to produce a cleaning mechanism that covers only part of the surface of the chip 29 in a specific direction, it is sufficient to produce only adjacent line portions. The number of annular regions 26*a*, 26*b*, 26*c* may vary according to the area to be covered, and there may be any number of phases (or of phase-shifted pulsed voltages), provided that there are no fewer than three, even though the solution with three phases is the simplest.

Furthermore, the circuitry solution shown may be modified by generating a single pulsed voltage at an output of the voltage source 28 and providing delay means on the conductive lines 27a, 27b, 27c connected to the annular regions 26a, 26b, 26c.

These and other changes can be made to the invention in light of the above-detailed description. In general, in the following claims, the terms used should not be construed to limit the invention to the specific embodiments disclosed in the specification and the claims, but should be construed to include all cleaning structures that operate under the claims to provide a method for electrostatically cleaning particles. Accordingly, the invention is not limited by the disclosure, but instead the scope of the invention is to be determined by the following claims, which are to be construed in accordance with established doctrines of claim interpretation.

What is claimed is:

1. A hard disk driver, comprising:
    an electrostatic cleaning structure for dielectric particles, wherein said electrostatic cleaning structure comprises at least three conductive regions disposed adjacent to each other;
    a sequencing and periodic biasing circuit for said conductive regions to bias said conductive regions according to a sequence that produces removal of the dielectric particles in a desired direction; and
    a substrate of semiconductor material and an electrically insulating material layer extending on said substrate, wherein said conductive regions extend on said electrically insulating material layer.

2. The driver according to claim 1 wherein said sequencing and periodic biasing circuit comprises a pulsed voltage source and connection lines connected to said conductive regions to supply successive voltage pulses to conductive regions adjacent in said direction of desired removal.

3. The driver according to claim 2 wherein said pulsed voltage source has n outputs each connected to a respective connection line, wherein each connection line is connected to a conductive region of every nth conductive region and wherein different connection lines are connected to adjacent conductive regions.

4. The driver according to claim 3 wherein n is equal to three.

5. The driver according to claim 1 wherein said conductive regions extend along concentric closed lines.

6. The driver according to claim 1 wherein said conductive regions extend along concentric circumferences.

7. The driver according to claim 1, further comprising connection lines connected to said conductive regions to supply successive voltage pulses to conductive regions adjacent in said direction of desired removal, and wherein said conductive regions comprise metal of a first metal level, wherein said connection lines comprise metal of a second metal level, and further comprising a dielectric material layer extending between said conductive regions and said connection lines, wherein said dielectric material layer has contact openings between said conductive regions and said connection lines.

8. The hard disk driver of claim 1 wherein the electrostatic cleaning structure is formed adjacent to a microactuator of a read/write head.

9. The hard disk driver of claim 8 wherein the electrostatic cleaning structure is formed around the microactuator.

10. A system operable to remove a particle generated during read/write actuation of a hard disk, the system comprising:
    a microactuator to actuate the hard disk;
    an integrated device operatively positioned adjacent to the miroactuator, wherein the integrated device has a substrate of semiconductor material, an electrically insulating material layer extending on said substrate, and an electrostatic cleaning structure and wherein the cleaning structure has at least three conductive regions disposed adjacent to each other, wherein said conductive regions extend on said electrically insulating material layer; and
    a sequencing and biasing element connected to the plurality of conductive regions to bias the plurality of conductive regions, wherein the plurality of conductive regions are biased according to a sequence corresponding to a desired direction of removal of the particle, and wherein the biased conductive regions apply forces to the particle to move the particle in the desired direction.

11. The system of claim 10 wherein the sequencing and biasing element comprises a voltage source and a plurality of connection lines connecting the conductive regions to the voltage source, wherein the voltage source supplies successive voltage pulses through the connection lines to successive conductive regions, and wherein the voltage pulses are supplied by the voltage source in the sequence corresponding to the desired direction of removal of the particle.

12. The system of claim 10 wherein the conductive regions extend along concentric closed lines substantially surrounding the microactuator.

13. The system of claim 10 wherein the sequencing and biasing element is integrated with the integrated device.

14. A hard disk driver, comprising:
    an electrostatic cleaning structure for dielectric particles, wherein said electrostatic cleaning structure comprises at least three conductive regions disposed adjacent to each other;
    a sequencing and periodic biasing circuit for said conductive regions to bias said conductive regions according to a sequence corresponding to a direction of desired removal of the dielectric particles;
    a substrate of semiconductor material and an electrically insulating material layer extending on said substrate, wherein said conductive regions extend on said electrically insulating material layer; and
    a pulsed voltage source and connection lines connected to said conductive regions to supply successive voltage pulses to conductive regions adjacent in said direction of desired removal.

15. The driver according to claim 14 wherein said conductive regions comprise metal of a first metal level, wherein said connection lines comprise metal of a second metal level, and further comprising a dielectric material layer extending between said conductive regions and said connection lines, wherein said dielectric material layer has contact openings between said conductive regions and said connection lines.

* * * * *

UNITED STATES PATENT AND TRADEMARK OFFICE
CERTIFICATE OF CORRECTION

PATENT NO. : 6,496,997 B1
DATED : December 24, 2002
INVENTOR(S) : Bruno Murari et al.

It is certified that error appears in the above-identified patent and that said Letters Patent is hereby corrected as shown below:

<u>Title page,</u>
Item [56], U.S. PATENT DOCUMENTS, "5,658,718" should read as -- 5,657,188 --.

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,496,997 B1  Page 1 of 1
DATED : December 24, 2002
INVENTOR(S) : Bruno Murari et al.

It is certified that error appears in the above-identified patent and that said Letters Patent is hereby corrected as shown below:

<u>Title page,</u>
Item [73], Assignee, should read as -- STMicroelectronics S.r.l. --.
Item [74], *Attorney, Agent or Firm,* should read as -- Lisa K. Jorgenson; Robert Iannucci; Seed IP Law Group PLLC --.

Signed and Sealed this

Eleventh Day of May, 2004

JON W. DUDAS
*Acting Director of the United States Patent and Trademark Office*